2,733,244

3,4,5,6-TETRAHYDROPYRIMIDINE AND IMIDAZOLINE LOCAL ANESTHETICS

Martin E. Synerholm, John A. Faust, and Melville Sahyun, Santa Barbara, Calif., assignors to Melville Sahyun, doing business as Sahyun Laboratories, Santa Barbara, Calif.

No Drawing. Application May 27, 1954,
Serial No. 432,946

8 Claims. (Cl. 260—256.4)

This invention relates to substituted imidazolines and tetrahydropyrimidines and is more particularly concerned with compounds having the formula:

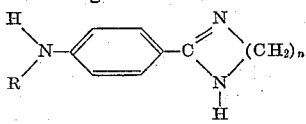

wherein $n$ is the integer 2 or 3, R is hydrogen or a lower-alkyl radical, and to acid addition salts of the foregoing materials.

In the pharmaceutical formulation of solutions of local anesthetics that are suitable for parenteral injection, many difficulties have been encountered. Solutions of the amino-alkyl ester types tend to lose their potency when made alkaline. A precipitate containing the basic anesthetic separates out and the resulting preparation is void of anesthetic potency. This precipitation and loss of potency varies with the concentration of the anesthetic. For example:

| | | pH at which Precipitation Occurs | |
|---|---|---|---|
| | | 1:100 | 1:1000 |
| Strength of Solution | | | |
| Amethocaine | pH | 6.1 | 9.1 |
| Procaine | | 8.4 | |
| Nupercaine | | | 6.5 |

If, on the other hand, parenteral solutions of such anesthetics that are aminoalkyl esters are made slightly acid to keep them in solution, because of hydrolysis their physiologic potency becomes weaker on standing, and in a relatively short period of time, their anesthetic activity is lost. Some clinical investigators who were unable to produce intraspinal anesthesia in certain patients noted that the alkalinity of the cerebrospinal fluid was very high in these cases. Presumably, loss of anesthetic potency was due to the precipitation of the local anesthetic in such an alkaline medium.

It is, therefore, a particular object of the present invention to provide local anesthetics which are active both topically and subconjunctivally, and which are soluble at a wide pH range. A further object of the present invention is to provide local anesthetics which do not lose their potency in an alkaline or acidic medium. Still another object of the present invention is to provide local anesthetics having the structure 2-(4-amino- and 4-alkylamnio-phenyl)imidazoline or tetrahydropyrimidine, as well as hydrates and acid addition salts thereof. Other objects will become apparent hereinafter.

It has unexpectedly been found that the compounds of the present invention, while retaining a para-amino moiety with a benzene ring, are active as local anesthetics, over a wide pH range, both alkaline and acidic. This activity occurs both topically and subconjunctivally and is surprising in view of the inactivity of the usual para-aminobenzoic acid ester local anesthetics, which are inactive at an alkaline and an acidic pH.

The compounds of the present invention may be readily prepared by the reaction of a lower-alkyl or aryl ester of an appropriate para-aminobenzoic acid with ethylene or trimethylene diamine. Suitable esters include, for example, methyl, ethyl, propyl, butyl, hexyl, pentyl, et cetera, para-amino-benzoates, and phenyl, tolyl, xylyl, cresyl, et cetera, para-aminobenzoates, as well as the corresponding lower-alkyl-aminobenzoates, such as para-methylamino, para-ethylamino, para-propylamino, para-butylamino, para-pentylamino, para-hexylamino, et cetera, aminobenzoates, et cetera. This reaction is normally carried out by heating the ethylene-diamine to about its reflux temperature and adding the ester as above-defined to the boiling liquid with subsequent heating at reflux for a suitable time. It is to be understood that other temperatures may be used, with a consequent increase or decrease in reaction time, depending on the particular temperature used. Equimolecular quantities of reactants are satisfactory, although an excess of the diamine is preferred. Upon completion of the reaction, the reaction mixture may be cooled and the desired amine compound separated in a conventional manner.

An alternative and preferred procedure for preparing the compounds of the present invention contemplates condensing para-aminobenzonitrile, or its lower-alkylamino analogues such as, for example, para-methylamino-, para-ethylamino-, para-propylamino-, para-butylamino-, para-pentylamino-, et cetera, benzonitrile with the mono-para-toluenesulfonate salt of ethylenediamine or trimethylene diamine. The condensation is readily conducted by heating a mixture of the materials at 175-200 degrees centigrade for an appropriate period, generally about two hours. The ratio of reactants preferably employed is two moles of the diamine mixture to one mole of the nitrile, however, other ratios are operative. After heating and cooling the reaction mixture, the resulting amine may be separated and purified in conventional manner.

Acid addition salts such as, for example, the tartrate, nitrate, sulfate, hydrochloride, hydrobromide, hydriodide, acetate, phosphate, et cetera, may be prepared by contacting an ethereal solution of the appropriate salt-forming material with an ethereal solution of the free amine and separating the resulting salt. Since certain imidazolines of the present invention will hydrate readily, anhydrous conditions must be maintained if the dehydrated material is desired.

The following preparation and examples illustrate the method of preparation of the compounds of the present invention but are not to be construed as limiting.

PREPARATION.—4-(N-BUTYLAMINO)BENZONITRILE

A mixture of 23.6 grams (0.2 mole) of 4-aminobenzonitrile, 27.4 grams (0.2 mole) of n-butyl bromide and 26.5 grams (0.25 mole) of anhydrous sodium carbonate was heated progressively from 90 to 160 degrees centigrade over a period of four and one-half hours and under reflux conditions. The mixture was cooled, diluted with water, and the dark insoluble oil extracted with ether. The ether extracts were combined, dried over anhydrous magnesium sulfate, and the mixture distilled through a six-inch Vigreux column. There was thus obtained 14.6 grams (42 percent of the theoretical yield) of 4-(n-butylamino)-benzonitrile as a pale yellow oil, boiling at 167–170 degrees centigrade at two millimeters of mercury absolute, melting at 48–49 degrees centigrade.

In a manner similar to that of the foregoing preparation, other alkylamino-benzonitriles can be prepared by substituting a suitable alkyl halide for the n-butyl bromide of the above preparation, for example, 4-methylamino-, 4-ethylamino, 4-propylamino-, 4-pentylamino-, 4-hexylamino-benzonitrile.

Example 1.—2-(4-aminophenyl)imidazoline para-toluenesulfonate

A mixture of 17.7 grams (0.015 mole) of para-aminobenzonitrile and 37.0 grams (0.016 mole) of ethylenediamine mono-para-toluenesulfonate was heated at 200–210 degrees centigrade for about two hours, when the evolution of ammonia has ceased. The liquid reaction mixture which crystallized when cooled, was dissolved in 175 milliliters of boiling water and decolorized with charcoal. The cooled solution deposited large colorless crystals of para-toluenesulfonate salt of 2-(4-aminophenyl)imidazoline, which, when isolated and dried, amounted to 42 grams (83 percent of the theoretical yield), melting at 212–213 (corrected) degrees centigrade.

Analysis:
Calculated for $C_{16}H_{19}N_3O_3S$ _____ N, 12.60
Found _____ 12.54

Example 2.—2-(4-aminophenyl)imidazoline monohydrate

Forty-two (42) grams of the para-toluenesulfonate salt of 2-(4-aminophenyl)imidazole was dissolved in 75 milliliters of boiling water and ten milliliters of fifty percent sodium hydroxide solution added thereto. A crystalline solid (the free base) as a monohydrate, separated, and after repeated crystallization from water provided light tan, blade-like crystals, melting at approximately 94–96 degrees centigrade.

Analysis:
Calculated for $C_9H_{17}N_3.H_2O$ _____ N, 23.45
Found _____ 23.71

Example 3.—2-(4-aminophenyl)imidazoline

The monohydrated material of Example 2 was subjected to a short path distillation at 1–2 millimeters of mercury absolute and a heating bath maintained at 200–220 degrees centigrade. The distillate, 2-(4-aminophenyl)imidazoline, solidified to a hygroscopic material, melting at 146–148 degrees centigrade, which may be readily converted to the monohydrate by recrystallization from water.

Analysis:
Calculated for $C_9H_{11}N_3$ _____ N, 26.06
Found _____ 25.87

Example 4.—2-[4-(n-butylamino)phenyl]imidazoline hydrochloride

A mixture of 5.2 grams (0.03 mole) of 4-(n-butyl)aminobenzonitrile and 7.0 grams (0.03 mole) of ethylenediamine para-toluenesulfonate was heated at 190–210 degrees centigrade for two hours. The cooled reaction mass was dissolved in dilute hydrochloric acid, the solution was charcoaled and made basic with sodium hydroxide. The soft solid which separated was isolated and recrystallized from a mixture of isopropanol-petroleum ether after which it was dissolved in an excess of ethanolic hydrogen chloride. The solution was diluted with ether and cooled to yield 2.1 grams (28 percent of the theoretical yield) of pale tan needles of 2-[4-(n-butylamino)-phenyl]-imidazoline hydrochloride, melting at 229–231 degrees centigrade.

Analysis:
Calculated for $C_{13}H_{20}ClN_3$ _____ N, 16.56
Found _____ 16.32

In a manner similar to that of the above example, other 2-[4-alkylamino]imidazolines may be prepared by substituting another lower-alkylamino-benzonitrile for the butylaminobenzonitrile of the above example.

Example 5.—2-[4-(n-butylamino)phenyl]-3,4,5,6-tetrahydropyrimidine para-toluenesulfonate A mixture of 8.7 grams (0.05 mole) of 4-(n-butylamino)benzonitrile, 12.6 grams (0.03 mole) of 1,3-diaminopropane bis-para-toluenesulfonate and 2.2 grams (0.03 mole) of 1,3-diaminopropane was heated at 190–210 degrees centigrade for two hours. Approximately 300 milliliters of dilute hydrochloric acid was added to the cooled reaction mixture and the insoluble material was removed by filtration. Alkalization with sodium hydroxide precipitated an oil which solidified and was recrystallized from a mixture of ten parts of acetone and one part of methanol. There was thus obtained 3.1 grams of 2-[4-(n-butylamino)phenyl]-3,4,5,6-tetrahydropyrimidine paratoluenesulfonate, melting at 161–162 degrees centigrade (corrected).

Analysis:
Calculated for $C_{21}H_{29}N_3O_3S$ _____ N, 10.42
Found _____ 10.38

Example 6.—2-[4-(n-butylamino)phenyl]-3,4,5,6-tetrahydropyrimidine dihydrochloride An alcohol solution of 2-[4-(n-butylamino)phenyl]-3,4,5,6-tetrahydropyrimidine para-toluenesulfonate was treated with an excess of ethanolic hydrogen chloride and the resulting solution diluted with ether. The solid, 2-[4-(n-butylamino)phenyl]-3,4,5,6-tetrahydropyrimidine dihydrochloride, which separated, melted at 202–204 degrees centigrade (corrected) with decomposition.

Analysis:
Calculated for $C_{14}H_{23}Cl_2N_3$ _____ N, 13.8
Found _____ 13.4

Example 7

2-(para-aminophenyl)imidazoline bitartrate dihydrate, prepared by treating the free amine with an alcoholic solution of tartaric acid, when recrystallized from ethanol-water, has an appearance of white feathery needles, melting at 206–207 degrees centigrade with decomposition (corrected) and is soluble to the extent of two percent in water at twenty degrees centigrade. Its one percent aqueous solution has a pH of 3.7. The pH of a two percent solution may be raised to 11 without causing precipitation of the base.

Analysis:
Calculated for $C_{13}H_{21}N_3O_8$ _____ N, 12.10
Found _____ 12.04

Example 8

The phosphate salt of 2-(para-aminophenyl)imidazoline, when recrystallized from water, has a melting point of 277–284 degrees centigrade (corrected).

Analysis:
Calculated for $C_9H_{14}O_4N_3P$ _____ N, 16.25
Found _____ 16.02

In the manner of the foregoing examples, other acid addition salts of the free amines of the present invention may be prepared, such as, for example, the sulfate, nitrate, hydrobromide, hydriodide, lactate, et cetera.

Various modifications may be made in the present invention without departing from the spirit or scope thereof and it is to be understood that we limit ourselves only as defined in the appended claims.

We claim:

1. A material selected from the group consisting of compounds having the formula:

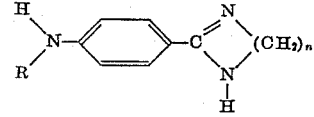

wherein R is selected from the group consisting of hydrogen and lower-alkyl and n is an integer selected from the group consisting of 2 and 3, and stable, non-toxic acid addition salts and hydrates thereof.

2. A 2-imidazoline having the formula:

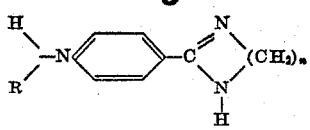

wherein R is lower-alkyl and $n$ is the integer 2.

3. A 2-(3,4,5,6-tetrahydropyrimidine) having the formula:

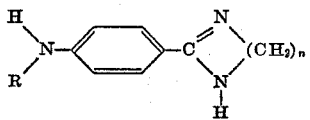

wherein R is lower-alkyl and $n$ is the integer 3.

4. 2-(4-aminophenyl)imidazoline.
5. 2-[4-($n$-butylamino)phenyl]imidazoline hydrochloride.
6. 2-[4-($n$-butylamino)phenyl]-3,4,5,6-tetrahydropyrimidine dihydrochloride.
7. 2-(para-aminophenyl)imidazoline bitartrate.
8. The phosphate salt of 2-(para-aminophenyl)imidazoline.

No references cited.